United States Patent
Ma et al.

(10) Patent No.: US 11,341,993 B2
(45) Date of Patent: May 24, 2022

(54) LOAD/UNLOAD RAMPS WITH CHANNELS

(71) Applicant: Seagate Technology LLC, Cupertino, CA (US)

(72) Inventors: YiChao Ma, Singapore (SG); Xiong Liu, Singapore (SG); Pow Hing Yong, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/826,680

(22) Filed: Mar. 23, 2020

(65) Prior Publication Data

US 2021/0295871 A1    Sep. 23, 2021

(51) Int. Cl.
| | |
|---|---|
| *G11B 5/54* | (2006.01) |
| *G11B 21/22* | (2006.01) |
| *G11B 21/12* | (2006.01) |
| *G11B 25/04* | (2006.01) |
| *G11B 23/03* | (2006.01) |
| *G11B 5/55* | (2006.01) |

(52) U.S. Cl.
CPC ............... *G11B 5/54* (2013.01); *G11B 21/12* (2013.01); *G11B 21/22* (2013.01); *G11B 23/0302* (2013.01); *G11B 25/043* (2013.01); *G11B 5/55* (2013.01); *G11B 23/0316* (2013.01)

(58) Field of Classification Search
None
See application file for complete search history.

(56) References Cited

U.S. PATENT DOCUMENTS

| | | | |
|---|---|---|---|
| 5,638,241 A | 6/1997 | Sonderegger | |
| 6,055,134 A * | 4/2000 | Boutaghou | G11B 5/54 360/254.7 |
| 6,091,576 A | 7/2000 | Eckerd et al. | |
| 6,856,489 B2 | 2/2005 | Hawwa et al. | |
| 7,986,496 B2 | 7/2011 | Ohta et al. | |
| 2006/0215322 A1 | 9/2006 | Oishi | |
| 2006/0262448 A1* | 11/2006 | Okada et al. | G11B 5/54 360/69 |
| 2008/0204925 A1* | 8/2008 | Ohta et al. | G11B 21/12 360/75 |
| 2010/0061012 A1* | 3/2010 | Seki et al. | G11B 21/22 360/99.06 |
| 2012/0075750 A1 | 3/2012 | Chan et al. | |
| 2020/0027477 A1 | 1/2020 | Garbarino | |

FOREIGN PATENT DOCUMENTS

KR       20070103878 A  * 10/2007 ............ G11B 21/22

* cited by examiner

*Primary Examiner* — Craig A. Renner
(74) *Attorney, Agent, or Firm* — Faegre Drinker Biddle & Reath LLP (57) ABSTRACT

A load/unload ramp includes a body with ramps, load/unload surfaces, and a vertical wall. The ramps include outer grooves positioned between the ramps. The load/unload surfaces extend from the respective ramps. The vertical wall includes channels extending through the vertical wall. In embodiments, the channels are positioned between the load/unload surfaces.

18 Claims, 8 Drawing Sheets

LOAD/UNLOAD RAMPS WITH CHANNELS

SUMMARY

In certain embodiments, a load/unload ramp includes a body with ramps, load/unload surfaces, and a vertical wall. The ramps include outer grooves positioned between the ramps. The load/unload surfaces extend from the respective ramps. The vertical wall includes channels extending through the vertical wall. The channels are positioned between the load/unload surfaces.

In certain embodiments, a hard disk drive includes a base deck and a load/unload ramp coupled to the base deck. The load/unload ramp incudes ramps with load/unload surfaces and a body with a vertical wall with channels extending horizontally through the vertical wall.

In certain embodiments, a method for operating a hard disk drive is disclosed. The hard disk drive includes a base deck, a spindle motor, magnetic recording media coupled to the spindle motor, and a load/unload ramp coupled to the base deck. The method includes rotating the magnetic recording media to direct air towards an air-bearing side of the load/unload ramp. The method further includes passing the air through horizontal channels of the load/unload ramp from respective entrances of the channels on the air-bearing side of the load/unload ramp towards respective exits of the channels.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

When hard disk drives operate, air circulates within the internal cavities of the hard disk drives. This circulating air can negatively affect stability and performance of components of the hard disk drives. For example, turbulent air can cause rotating magnetic recording media to vibrate or "flutter" and/or sliders to be knocked off track and out of position. These events can cause errors (e.g., track misregistration errors) when writing data to or reading data from the rotating magnetic recording media. For hard disk drives with multiple magnetic recording media, it has been found that sliders positioned between two of the magnetic recording media (as opposed to the outer top and bottom sliders that are not between two magnetic recording media) experience more air-induced vibration. As the sliders approach the hard disk drives' load/unload ramps (and therefore the outer diameter of the magnetic recording media), the amount of air-induced vibration increases. Certain embodiments of the present disclosure are accordingly directed to reducing air-induced vibration within hard disk drives.

Figure 1:
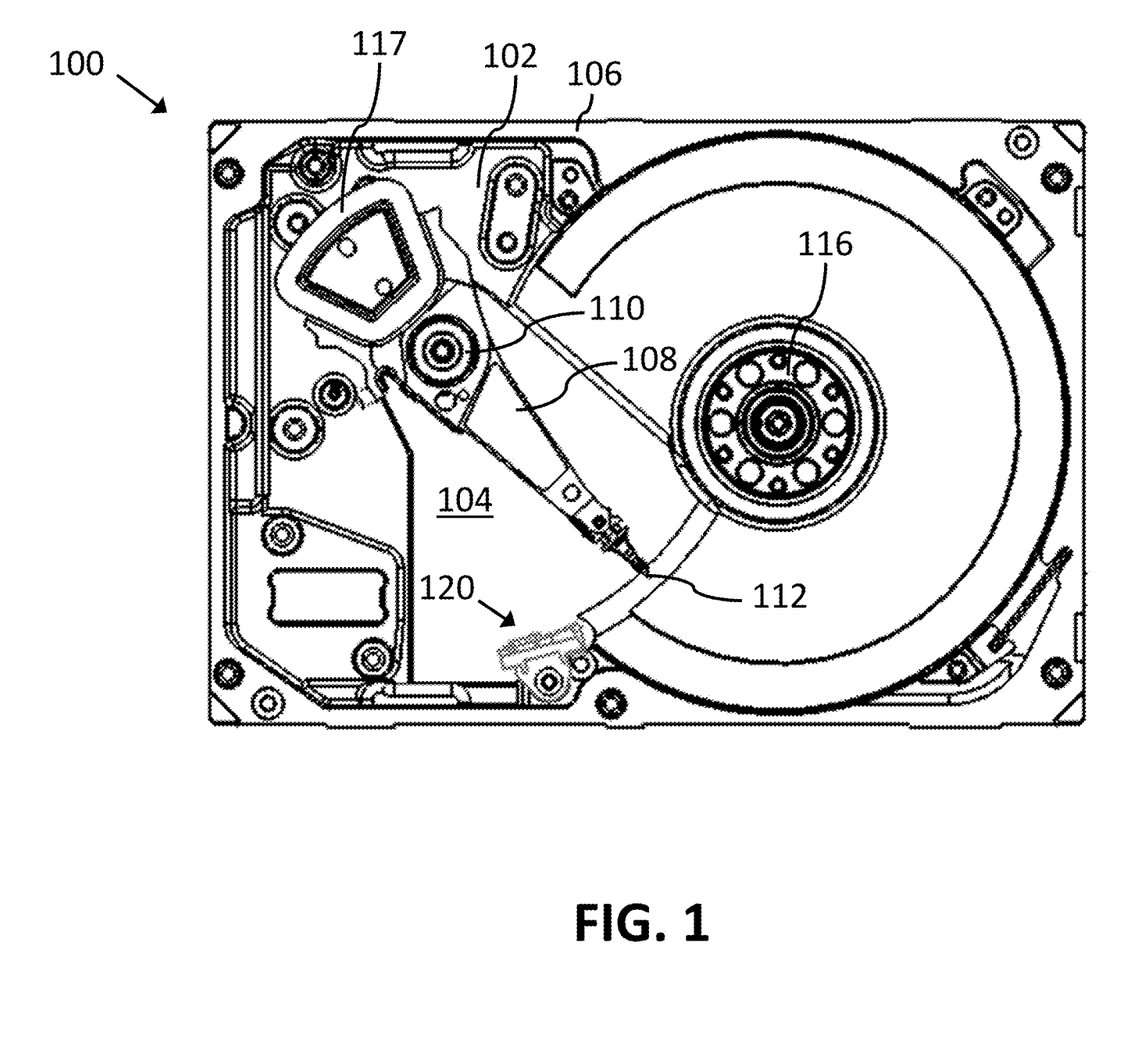
FIG. 1 shows a top view of portions of a hard disk drive, in accordance with certain embodiments of the present disclosure.

FIG. 1 shows a hard disk drive 100 including a base deck 102. The base deck 102 includes a base member or a floor 104 with side walls 106 that form an internal cavity in which various hard disk drive components are positioned. As shown in FIG. 1, the side walls 106 extend around a periphery of the floor 104. When the hard disk drive 100 is assembled, a cover is coupled to the base deck 102 to enclose the hard disk drive components within the internal cavity.

Figure 2:
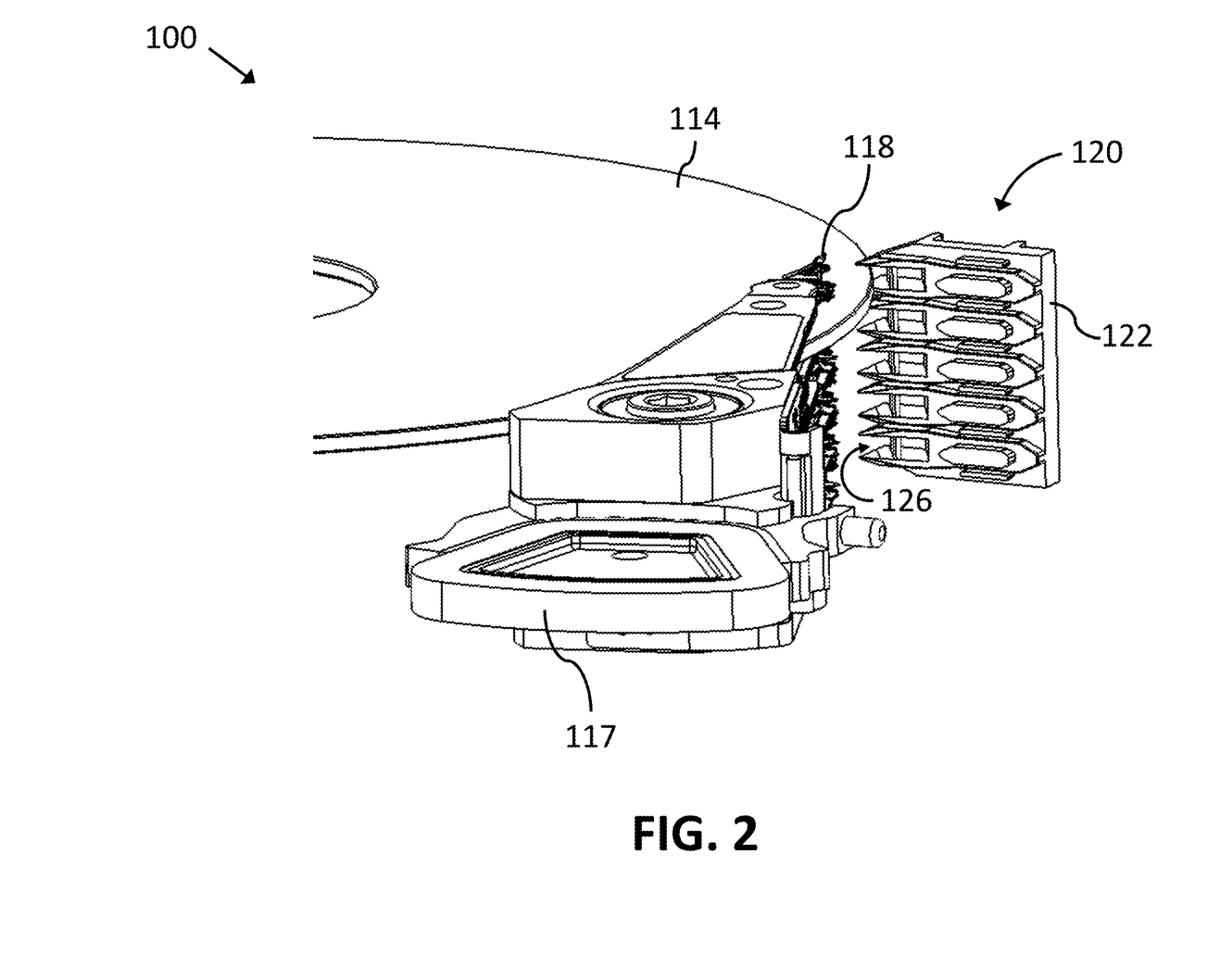
FIG. 2 shows a side view of a load/unload ramp and components of the hard disk drive of FIG. 1, in accordance with certain embodiments of the present disclosure.

FIG. 1 shows the hard disk drive 100 with an actuator assembly 108, which can rotate around a pivot bearing 110. The actuator assembly 108 positions sliders each with read/write heads 112 over data tracks on rotating magnetic recording media 114 (as shown in FIG. 2). During operation, a spindle motor 116 rotates the magnetic recording 114 media while the actuator assembly 108 is driven by a voice coil motor assembly (a coil portion 117 of which is shown in FIGS. 1 and 2) to pivot around the pivot bearing 110. The read/write heads 112 write data to the magnetic recording media 114 by generating and emitting a magnetic field towards the magnetic recording media 114 which induces magnetically polarized transitions on the desired data track on the magnetic recording media 114. The magnetically polarized transitions are representative of the data. The read/write heads 112 sense (or "read") the magnetically polarized transitions with a magnetic transducer. As the magnetic recording media 114 rotates adjacent the read/write heads 112, the magnetically polarized transitions induce a varying magnetic field into a magnetic transducer of the read/write heads 112. The magnetic transducer converts the varying magnetic field into a read signal that is delivered to a preamplifier and then to a read channel for processing to be used by a host system (e.g., server, laptop computer, desktop computer).

When the read/write heads 112 are not positioned over the magnetic recording media 114, lift tabs 118 (as shown in FIG. 2) positioned at the distal ends of the actuator assembly 108 can rest on a load/unload ramp 120 (hereinafter referred to as "the ramp 120"). The ramp 120 is coupled to the floor 104 of the base deck 102 by a fastener. As will be described in more detail below, the ramp 120 includes ramp-like surfaces on which the lift tabs 118 near the sliders slide on when being loaded onto or unloaded from the ramp 120. In certain embodiments, the ramp 120 is made by molding processes. As such, the various features of the ramp 120 described below may be integrally formed as a single, molded component. In certain embodiments, the ramp 120 is made from a plastic material (e.g., a thermoplastic material such as polyoxymethylene, which provides high stiffness, low friction, and dimensional stability).

As mentioned above, during operation of the hard disk drive 100, air circulates throughout the internal cavity and around the components of the hard disk drive 100. This air can affect the ability of the hard disk drive 100 to accurately write and read data. FIGS. 2-6 show various features that help reduce the amount of air turbulence created or existing at vulnerable parts of the hard disk drive 100 while FIG. 7 shows an alternative design of a ramp 200 that does not include the air-turbulence-reducing features shown in FIGS. 2-6.

FIG. 2 shows the ramp 120 including a body 122. The body 122 includes outer grooves 126 shaped such that an outer portion of the magnetic recording media 114 can extend at least partially within the outer grooves 126. As such, the outer grooves 126 can be said to have media-facing surfaces 128 (as shown in FIG. 3).

Figure 3:
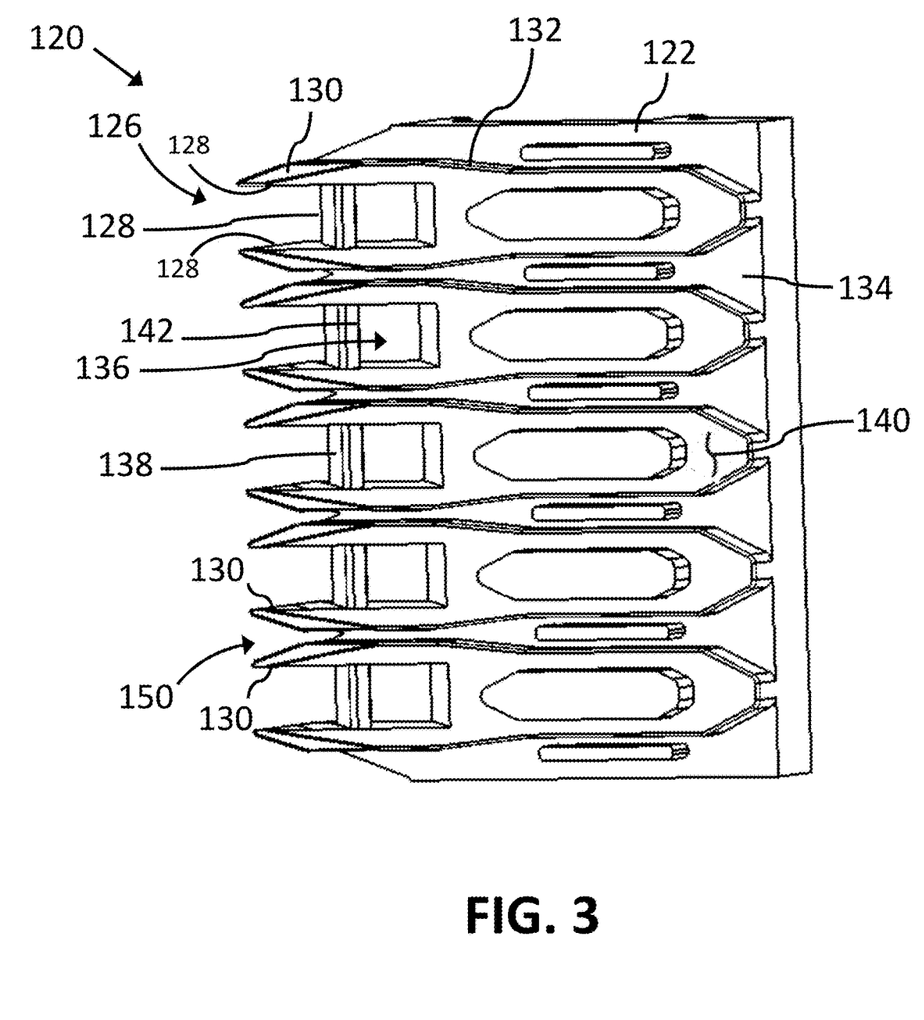
FIGS. 3 and 4 show side views of the load/unload ramp of FIG. 2, in accordance with certain embodiments of the present disclosure.

FIG. 3 shows that the outer grooves 126 are positioned between ramps 130 or ramp surfaces on the body 122. The body 122 also includes load/unload surfaces 132 extending from the respective ramps 130. The respective load/unload surfaces 132 and ramps 130 can be considered to be one continuous surface. When the actuator assembly 108 rotates so that the lift tabs 118 rests on the ramp 120 (e.g., the unloaded position), the lift tabs 118 first contact and slide along and up the ramps 130 and then contact and slide along the load/unload surfaces 132 on which the lift tabs 118 eventually rest. When the actuator assembly 108 rotates in the opposite direction to position the read/write heads 112 over the magnetic recording media 114 (e.g., the loaded position), the lift tabs 118 slide along the load/unload surfaces 132 and then down the ramps 130.

The body 122 includes a vertical wall 134, which includes channels 136 or openings that extend horizontally through the vertical wall 134. The channels 136 are positioned between respective load/unload surfaces 132 and provide a path for air to pass through the vertical wall 134. Because air can pass through the channels 136 of the vertical wall 134, less air will contact the ramp 120 and result in turbulent air flow around the ramp 120. As such, the channels 136 can help reduce the amount of turbulent air flow around the ramp 120 and therefore help reduce the amount of air-based vibration affecting the read/write heads 112 near the outer diameter of the magnetic recording media 114.

As shown in FIG. 3, one side of the channels 136 are formed by post-like structures 138 of the vertical wall 134 that separate the channels 136 from the outer grooves 126. The post-like structures 138 of the vertical wall help maintain stiffness of the ramp 120 structure.

The number of channels 136 within the ramp 120 may depend on, for example, the number of magnetic recording media 114 and/or the number of read/write heads 112 of the hard disk drive 100. In the example shown in the Figures, the ramp 120 includes five outer grooves 126 each corresponding to one magnetic recording medium 114 and includes five channels 136. Although the channels 136 are shown as being square or rectangular shaped, the channels 136 could be circular or otherwise optimized to control air turbulence. Additionally or alternatively, the channels 136 can be larger or otherwise consume a larger portion of the ramp 120 to help reduce the amount of turbulent air flow near the ramp 120. In certain embodiments, the vertical wall 134 can have rows of the channels 136.

Figure 4:
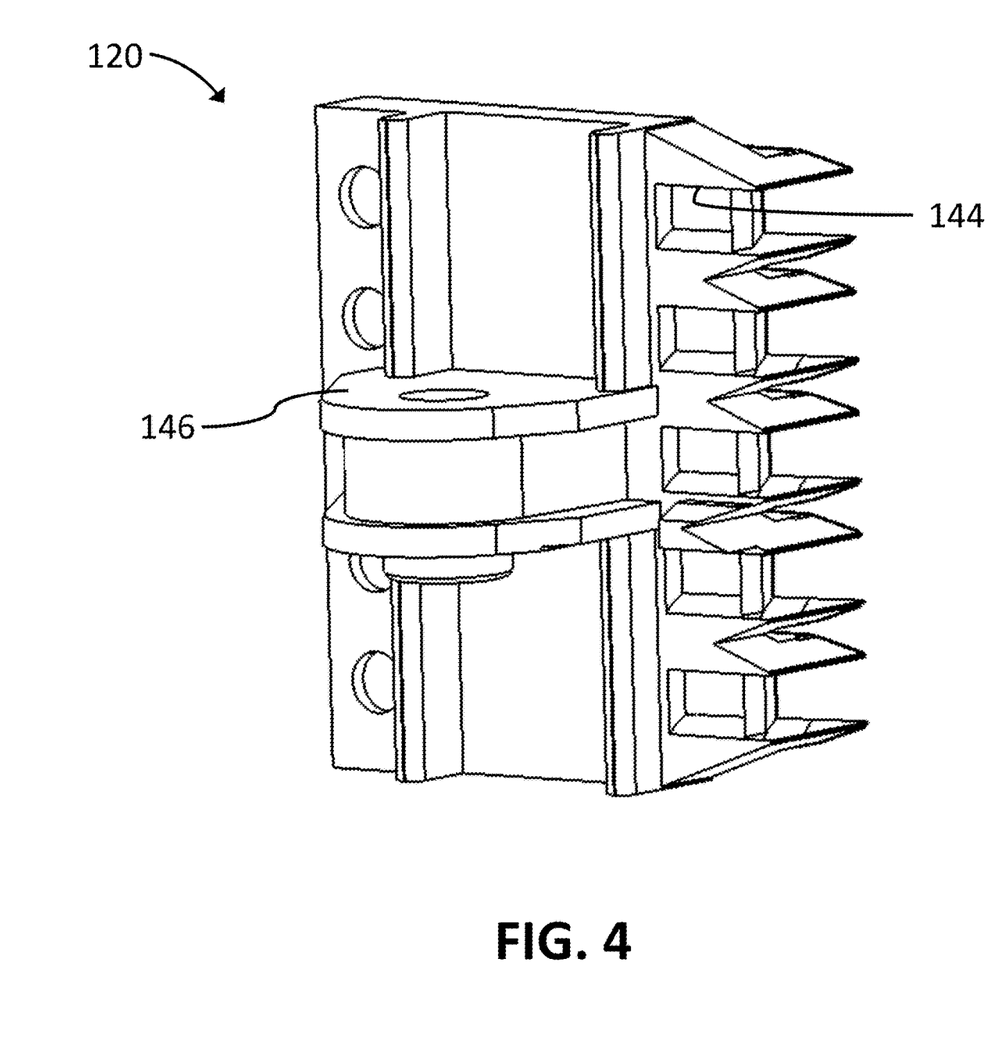

Air generally flows within the hard disk drive 100 in the same direction that the magnetic recording media 114 rotate. When the magnetic recording media 114 rotate counterclockwise, the air flows counterclockwise such that the air approaches the ramp 120 on the side of the ramp 120 (e.g., the air-bearing side 140) that includes the ramps 130 and load/unload surfaces 132. As such, the channels 136 can have respective entrances 142 on the air-bearing side 140 of the ramp 120. FIG. 4 shows the channels 136 including respective exits 144 on the side of the ramp 120 that includes a post 146 that is coupled to the ramp 120 to the base deck 102.

Figure 5:
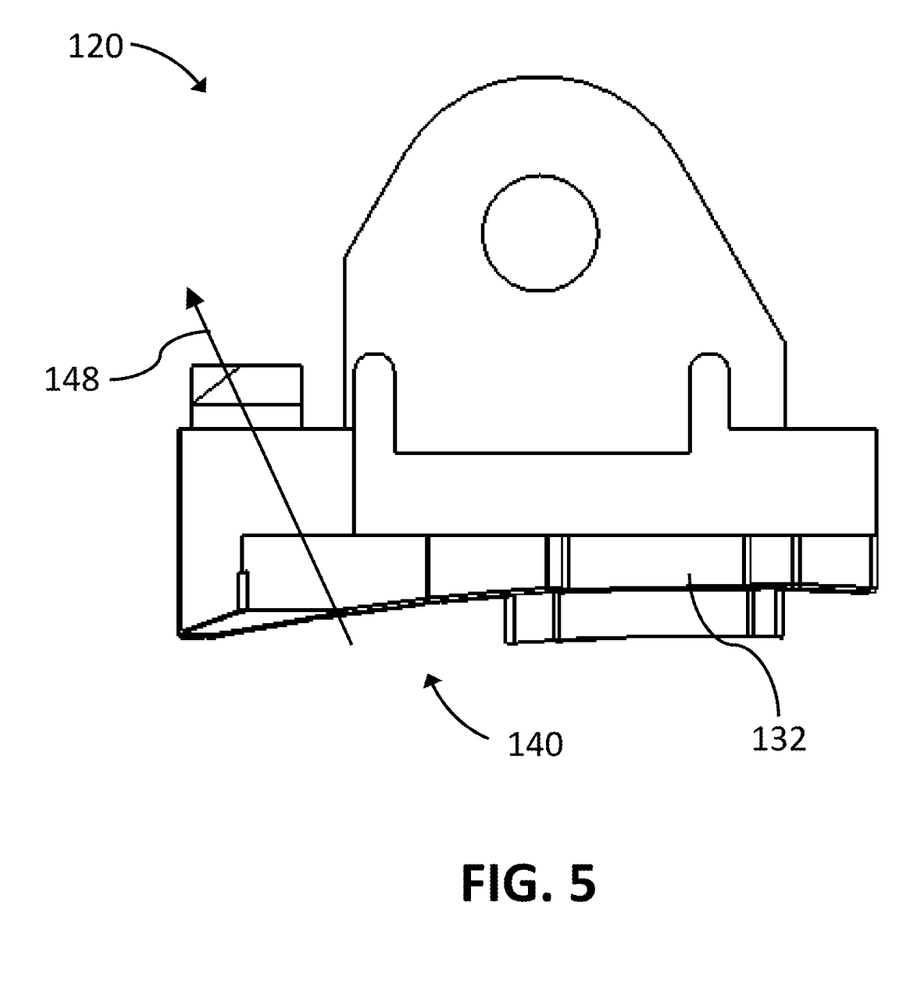
FIG. 5 shows a top view of the load/unload ramp of FIGS. 2-4, in accordance with certain embodiments of the present disclosure.

FIG. 5 includes an arrow 148 showing the general direction the air passes through the vertical wall 134 of the ramp 120. In certain embodiments, the channels 136 are angled or slanted as the channels 136 extend from the entrances 142 to the exits 144. For example, the interior walls of the channels 136 may be angled to direct air along a direction that is tangential to the outer edge of the magnetic recording media 114 extending within the respective outer grooves 126. In other embodiments, the channels 136 are shaped to direct air away from the magnetic recording media 114. Regardless of whether and how the channels 136 are angled, the height of the channels 136 and/or the width of the channels 136 can be substantially uniform as the channels 136 extend between the entrances 142 and the exits 144. In other embodiments, the height and/or the width of the channels 136 can increase as the channels 136 extend between the entrances 142 and the exits 144. For example, the thickness of the post-like structures 138 of the vertical wall 134 can be larger at the air-bearing side 140 of the ramp 120.

Additionally or alternatively, the ramp 120 can include other air-turbulence-reducing features. As shown in FIG. 3, in addition to the outer grooves 126, the ramp 120 can include gaps 150 between the ramps 130 that extend all the way through the ramp 120. These gaps 150 provide additional space for air to pass through the ramp 120. As shown in FIG. 3, the shape of the gaps 150 is defined at least partially by the shapes of the ramps 130, which create V-shaped gaps 150 in the example of FIG. 3. The ramps 130 can extend from the vertical wall 134 as cantilevered structures to form the gaps 150 between the ramps 130.

Figure 6:
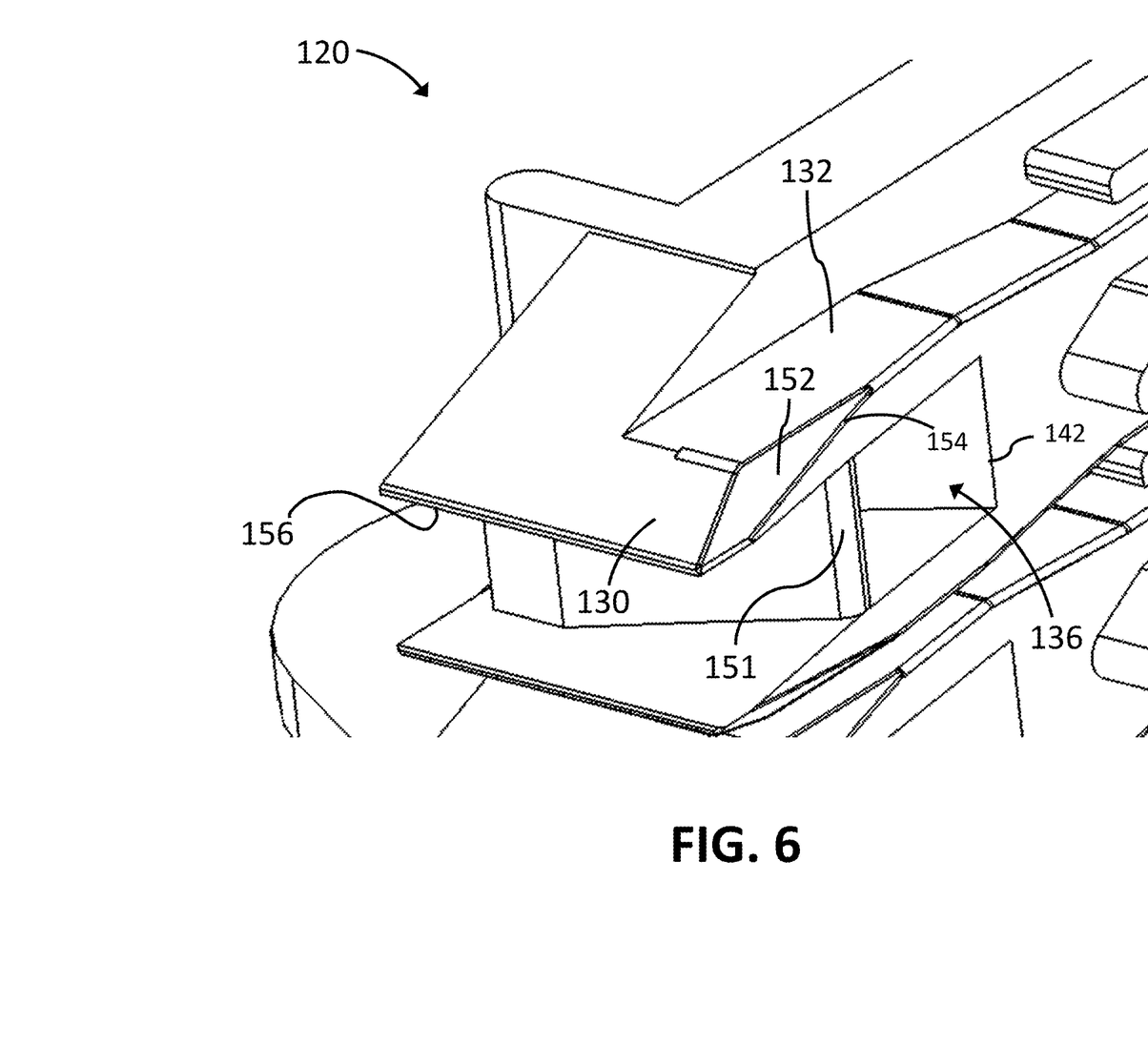
FIG. 6 shows a perspective view of a portion of the load/unload ramp of FIGS. 2-5, in accordance with certain embodiments of the present disclosure.
Figure 7:
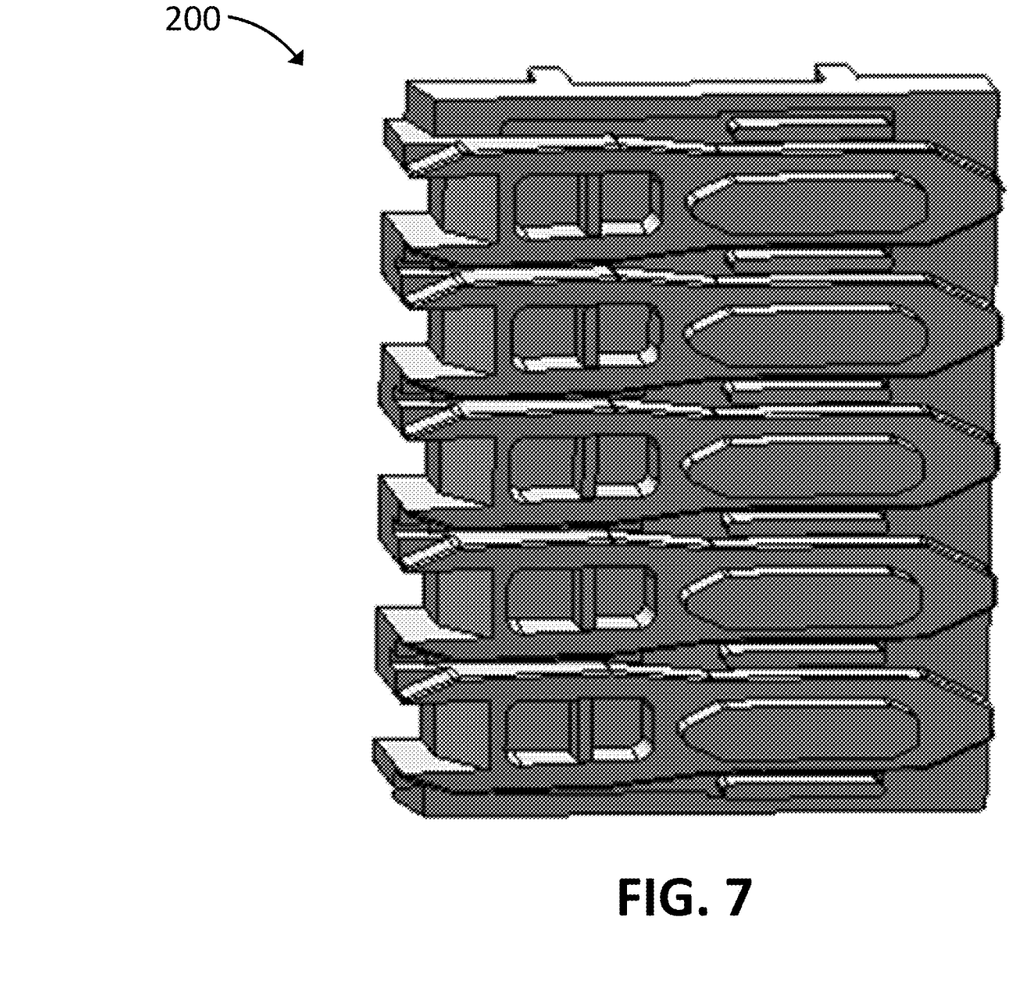
FIG. 7 shows an alternative design of a load/unload ramp.

Additionally or alternatively, the ramp 120 can include other air-turbulence-reducing features as best seen in FIG. 6. As one example, the entrances 142 of the channels 136 can include edges 151 that are rounded. The rounded edges 151 help create less air turbulence near the ramp 120. In certain embodiments, the rounded edges 151 have a radius of 0.2-0.4 mm (e.g., 0.25 mm).

As another example, respective ramps 130 can include slopes 152 along at least a part of front edges 154 of the ramps 130 (e.g., the edges of the ramps 130 on the air-bearing side 140 of the ramp 120). The slopes 152 are in addition to the slopes of the ramps 130 for the lift tabs 118 that start along a ramp edge 156. In certain embodiments, the slope 152 can have an angle of 30-60 degrees (e.g., a 45 degree angle). As the air approaches the ramps 130, the air can contact the slopes 152 as opposed to a horizontal surface. The slopes 152 help to smoothen the air as the air moves over or across the ramps 130.

In contrast to the ramp 120 of FIG. 1, the ramp 200 shown in FIG. 7 lacks a feature like the channels 136 and therefore blocks more air that approaches the ramp 120. This blocked air can then become turbulent, which affects the stability of the read/write heads 112. Further, the ramp 200 lacks features such as the gaps 150 between ramps and therefore blocks air approaching the edge of the ramp 200. This blocked air can also then become turbulent. Further, the ramp 200 lacks features such as the slopes 152 along the leading edges of the ramps and therefore allows air to approach and contact a horizontal wall. This air can then become turbulent.

As described above, FIGS. 2-6 show various features that help reduce the amount of air turbulence created or existing at vulnerable parts of the hard disk drive 100. In certain embodiments, the channels 136 let more air to pass through the ramp 120 and reduce the amount of turbulent air. Additionally or alternatively, the ramp 120 can include air-turbulence-reducing features in the form of the rounded edges 151 of the entrances 142 of the channels 136, the gaps 150 between the ramps 130, and/or the slopes 152 on the air-bearing side 140 of the ramps 130. Therefore, the various features shown in FIGS. 2-6 and described above can help mitigate the negative effect of air on the stability of the read/write heads 112.

Figure 8:
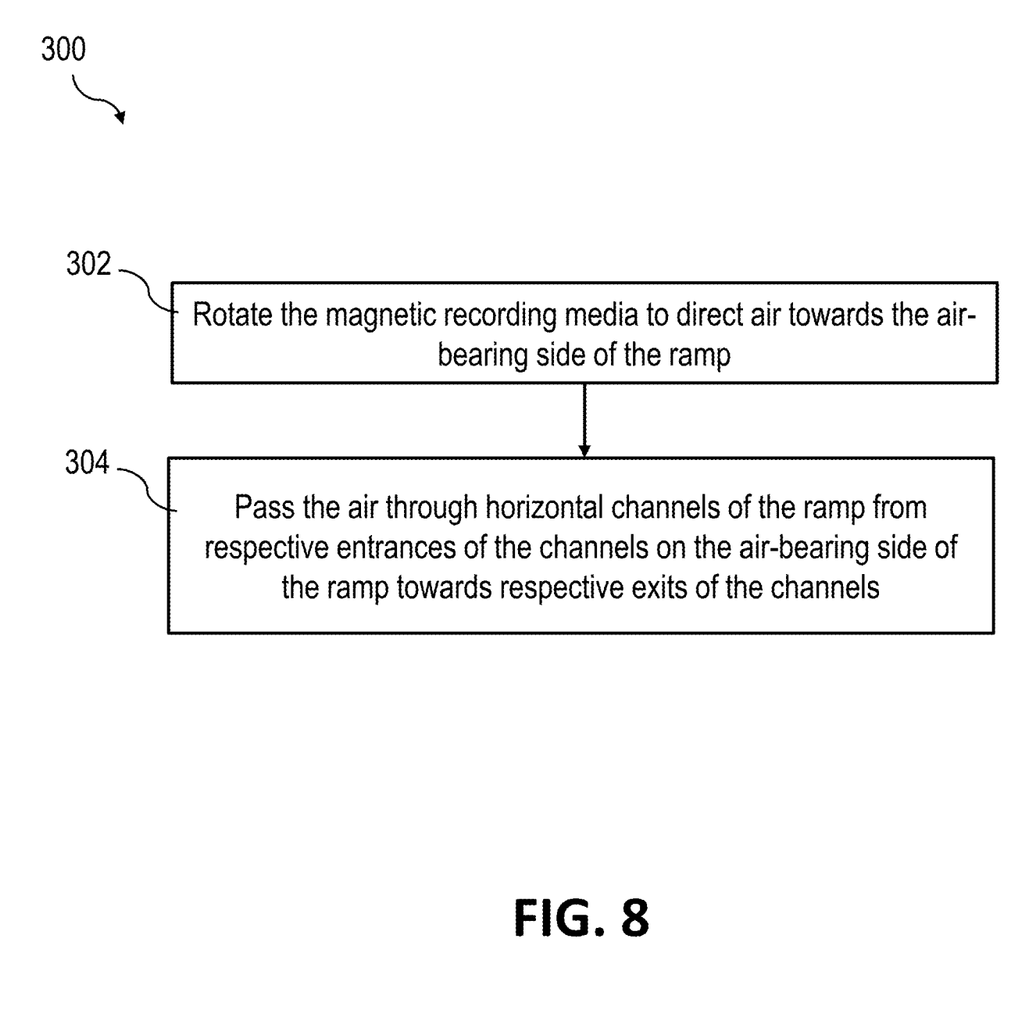
FIG. 8 shows a block diagram of a method for operating the hard disk drive of FIG. 1 and the load/unload ramps of FIGS. 2-6, in accordance with certain embodiments of the present disclosure.

FIG. 8 shows a block representation of steps of a method 300 for operating the hard disk drive 100. The method 300 includes rotating the magnetic recording media 114 to direct air towards the air-bearing side 140 of the ramp 120 (block 302 in FIG. 8). The method 300 further includes passing the air through horizontal channels 136 of the ramp 120 from respective entrances 142 of the channels 136 on the air-bearing side 140 of the ramp 120 towards respective exits 144 of the channels 136 (block 304 in FIG. 8).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A load/unload ramp comprising:
   a body including:
   an outer perimeter defined by exterior-facing surfaces, which include an air-bearing surface and an exit surface opposite the air-bearing surface,
   ramps with outer grooves positioned therebetween,
   load/unload surfaces extending from the respective ramps, and
   a vertical wall with channels extending through the body from the air-bearing surface to the exit surface and positioned between the load/unload surfaces.

2. The load/unload ramp of claim 1, wherein the channels include respective entrances, wherein at least one edge of the respective entrances is rounded.

3. The load/unload ramp of claim 2, wherein the at least one edge of the respective entrances has a radius with a range of 0.2-0.4 mm.

4. The load/unload ramp of claim 1, wherein the ramps include ramp surfaces and sloped air-bearing surfaces, wherein the sloped air-bearing surfaces are angled with respect to the respective ramp surfaces.

5. The load/unload ramp of claim 4, wherein the sloped air-bearing surfaces are angled at a 30-60 degree angle with respect to the respective load/unload surfaces.

6. The load/unload ramp of claim 1, further comprising gaps between the ramps.

7. The load/unload ramp of claim 6, wherein the gaps are positioned between the outer grooves.

8. The load/unload ramp of claim 6, wherein the gaps are V-shaped.

9. The load/unload ramp of claim 1, wherein the number of channels is the same as the number of outer grooves.

10. The load/unload ramp of claim 1, further comprising gaps between the ramps, wherein the ramps include sloped air-bearing surfaces, wherein the channels include an entrance with at least one edge that is rounded.

11. A hard disk drive comprising:
   a base deck; and
   a load/unload ramp coupled to the base deck and including:
   ramps with load/unload surfaces, and
   a body defining outer grooves shaped to accommodate magnetic recording media and defining an outer envelope of externally-facing surfaces, the body including a vertical wall with channels extending horizontally through the vertical wall from one of the externally-facing surfaces to another one of the externally-facing surfaces.

12. The hard disk drive of claim 11, further comprising V-shaped gaps positioned between the ramps.

13. The hard disk drive of claim 11, wherein the ramps include sloped air-bearing surfaces.

14. The hard disk drive of claim 11, wherein the channels include respective entrances, wherein at least one edge of the respective entrances is rounded.

15. The hard disk drive of claim 11, wherein the channels are rectangular shaped.

16. The hard disk drive of claim 11, wherein the channels include at least four interior walls.

17. The hard disk drive of claim 11, wherein the outer grooves are positioned between the ramps, the hard disk drive further comprising:
   the magnetic recording media at least partially extending within the outer grooves.

18. A method for operating a hard disk drive, which comprises a base deck, a spindle motor, magnetic recording media coupled to the spindle motor, and a load/unload ramp coupled to the base deck, the load/unload ramp including ramps and load-unload surfaces on an air-bearing side of the load/unload ramp, the method comprising:
   rotating the magnetic recording media to direct air towards the air-bearing side of the load/unload ramp; and
   passing the air through horizontal channels of the load/unload ramp from respective entrances of the channels on the air-bearing side of the load/unload ramp towards respective exits of the channels on an exit side that is opposite of the air-bearing side.

* * * * *